Jan. 5, 1954
M. E. MARTIN
2,664,761
GEARSHIFT CONVERSION APPARATUS
Filed March 12, 1951
3 Sheets-Sheet 1
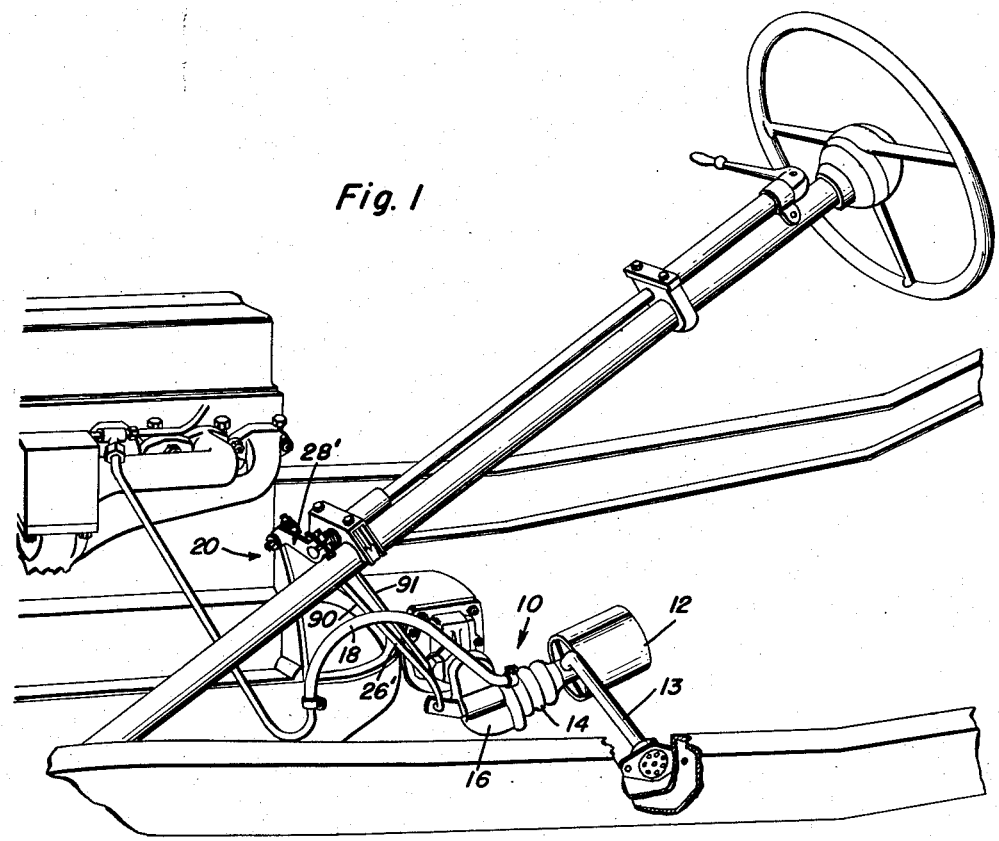
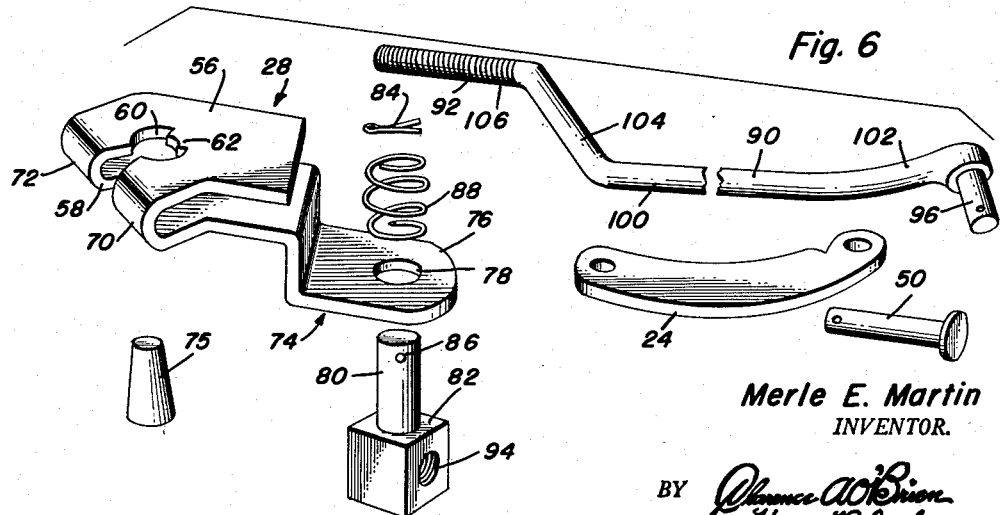
Merle E. Martin
INVENTOR.

Jan. 5, 1954 — M. E. MARTIN — 2,664,761
GEARSHIFT CONVERSION APPARATUS
Filed March 12, 1951 — 3 Sheets-Sheet 2

Merle E. Martin
INVENTOR.

Jan. 5, 1954     M. E. MARTIN     2,664,761
GEARSHIFT CONVERSION APPARATUS
Filed March 12, 1951     3 Sheets-Sheet 3

Merle E. Martin
INVENTOR.

Patented Jan. 5, 1954

2,664,761

UNITED STATES PATENT OFFICE 2,664,761

GEARSHIFT CONVERSION APPARATUS

Merle E. Martin, Cresco, Iowa

Application March 12, 1951, Serial No. 215,155

7 Claims. (Cl. 74—473)

The present invention relates to gearshift conversion apparatus and more particularly to an apparatus which can be employed for converting vehicles from vacuumatic shift to a manually operated mechanical shift.

An object of the present invention is to provide a gearshift conversion apparatus which can be employed for replacing their corresponding elements in the conventional vacuumatic shift mechanism of vehicles such as the Chevrolet models 1940 through 1948.

A further object of the present invention is to provide a gearshift conversion apparatus which eliminates the vacuum cylinder, bellows and protecting housing formerly employed in the Chevrolet motor vehicles models 1940 to 1948 and to substitute therefor the levers, rod and link to provide a resultant arrangement which can be manually operated to effect shifting of the gears of the conventional transmission of the vehicle.

Still another object of the present invention resides in the provision of a second lever means which replaces the corresponding element of the conventional vacuumatic shift arrangement and wherein the second lever means is provided with an offset portion to which the connecting rod is pivotally connected whereby the swivel and rod can turn their necessary arcs without striking the portions of the vehicle which are juxtaposed to the shifting means.

Another object of the present invention is to form the connecting rod with a substantially straight and elongated central portion having one end terminating in an arcuated portion for connection to the link while the opposite end is angulated and formed with an offset portion for connection with the swivel on the second lever means and whereby the rod will be kept from rubbing against the clutch housing of the motor during shifting of the transmission and also permit free reciprocation of the brake pedal.

Various other objects and advantages will become apparent from the detailed description to follow. The best form in which I have contemplated applying my invention is clearly illustrated in the accompanying drawings, wherein:

Figure 1 is a perspective view of the conventional arrangement now used on vehicles employing the vacuumatic shift, such as the Chevrolet, models 1940 to 1948;

Figure 6 is a detail perspective view of the several elements of the present invention in exploded arrangement.

Figure 2:
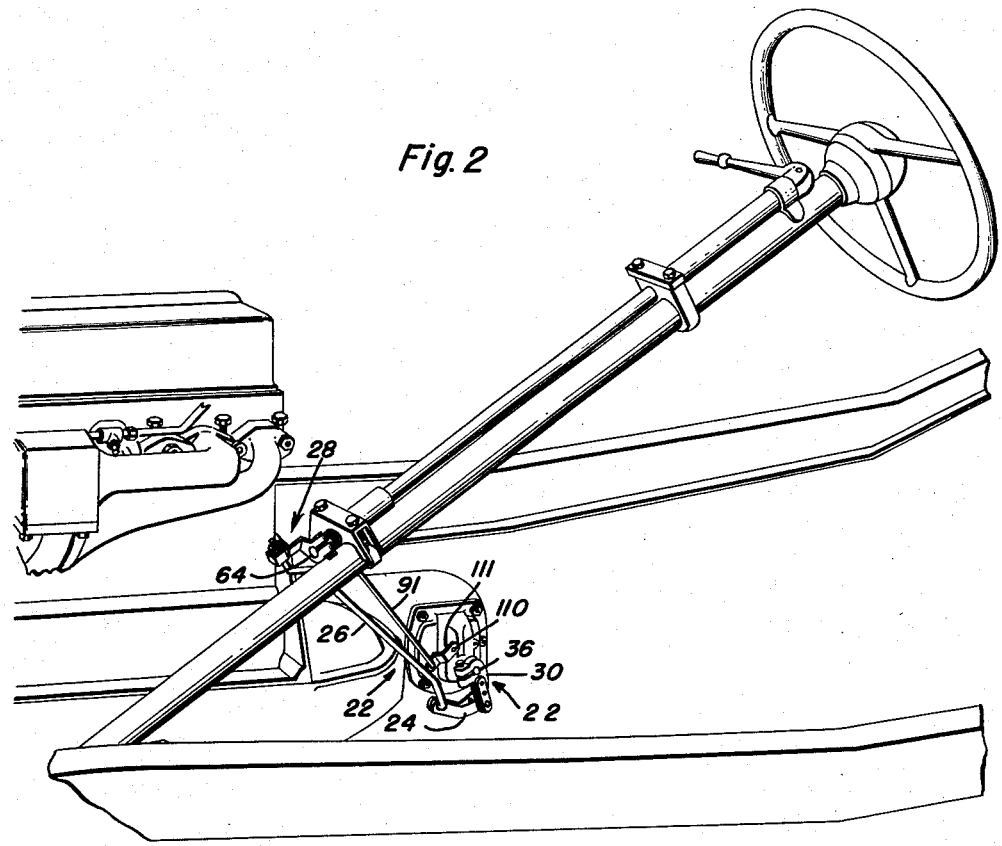
Figure 2 is a perspective view similar to Figure 1 but wherein the apparatus of the gearshift conversion kit has been incorporated into the vehicle of Figure 1, eliminating the vacuumatic shift apparatus.

Referring more particularly to the drawings, wherein like numerals designate like parts throughout, the numeral 10 designates generally a conventional vacuumatic shift arrangement having a vacuum cylinder 12, a bellows 14, protecting housing 16, vacuum hose 18 and the means 20 for interconnecting the gearshift shaft with the vacuumatic shift apparatus 10. The conventional elements employed and shown in Figure 1 are well known by those skilled in the art and a detailed description thereof may be found in the patent to E. S. McPherson, Patent No. 2,275,779, issued March 10, 1942. A more detailed description of the conventional apparatus is therefore deemed unnecessary.

The gearshift conversion apparatus of the present invention is designated generally by the numeral 21 and includes link 24, connecting rod 26 and second lever means 28, to be employed in conjunction with the conventional first lever means 22.

Figure 5:
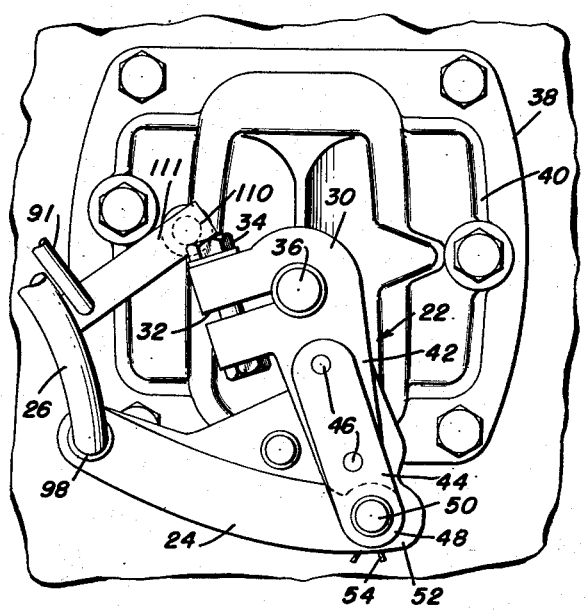
Figure 5 is a side elevational view of the gearshift conversion apparatus and showing the means interconnecting the rod with the second shaft of the gear box.

Figure 2 shows the assembled relation of the gearshift conversion apparatus while Figure 6 shows the several elements of the gearshift conversion apparatus in their assembled form. Figure 5 shows the conventionally employed first lever means 22 as comprising a C-clamp portion 30 being bifurcated at 32 and receiving a bolt 34 therethrough for clampingly securing the first lever means 22 to the second shaft 36 of the gear box 38 having the removable cover 40. The first lever means 22 has an extension portion 42 which is integrally formed with the C-clamp 30. A pair of elongated lever elements 44 are secured to opposite sides of the extension portion 42 by means of the pins 46, the end portions 48 of the lever elements 44 being in spaced parallel relation and having a bore therethrough for receiving the pin 50.

The link 24 is of arcuated form and has its end portion 52 rotatably supported on the pin 50 with a cotter pin 54 extending through the pin 50 to prevent displacement thereof.

The second lever means 28 is best disclosed in

Figure 3:
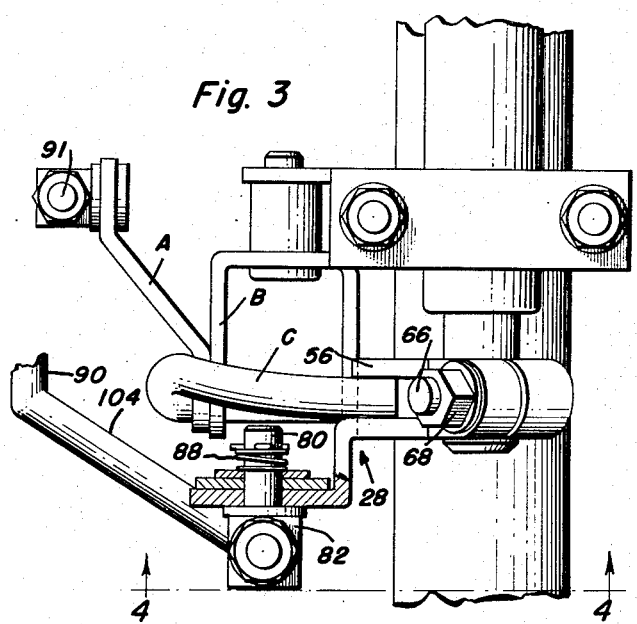
Figure 3 is a top plan view of the portions of the gearshift conversion apparatus disposed on the gearing column.
Figure 4:
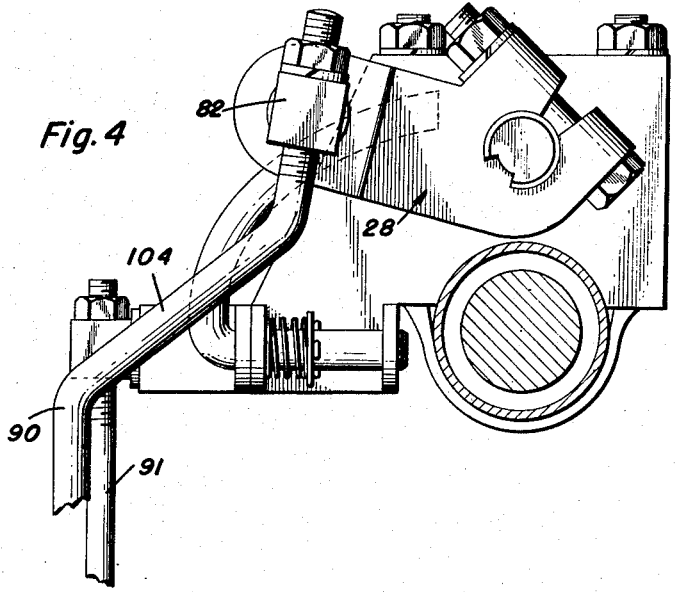
Figure 4 is a vertical transverse sectional view taken substantially along the plane of line 4—4 of Figure 3.

Figure 6 as comprising an elongated flat strap having a U-shaped portion 56 bifurcated at 58 and formed with a bore at 60. The bore 60 has a key 62 extending therein whereby the gearshift shaft 64 can be non-rotatably received within the bore 60. The bolt 66 and nut 68 are employed for clampingly urging the two jaws 70 and 72 together to form a firm grip on the shaft 64. Figures 3 and 4 clearly show the manner in which the bolt 66 and nut 68 are extended through the U-shaped strap portion 56.

The second lever means 28 has an offset portion 74 which includes the extension 76 which is in parallel relation to the U-shaped portion 56 of the flat strap. The offset portion 74 is also angulated with respect to the U-shaped portion, as will be best seen in Figure 4.

The offset portion 76 is formed with an aperture 78 for receiving the shank 80 of the swivel 82. It will thus be seen that the offset portion 76 provides sufficient clearance for the swivel 82 to pivot to the extent required. The lever means 28 is shorter than the lever previously conventionally employed and the two openings 60 and 78 are disposed in closer relation to each other than in the corresponding lever of the conventional arrangement. Thus, more effective leverage is provided for shifting the gears of the transmission without the aid of the vacuum cylinder. A cotter pin 84 is removably positionable within the bore 86 through the shank 80 and a swivel spring 88 is engaged beneath the cotter pin 84 and about the shank 80 for normally maintaining the swivel head 82 in frictional engagement with the underside of the offset portion 76.

The connecting rod 90 has a threaded end 92 which is removably positionable within the threaded bore 94 of the swivel head 82. The opposite end of the connecting rod 90 has a pin 96 extending laterally therefrom for pivotal connection to the link 24 at 98, the link 24 taking up the lost motion present in the original arrangement.

The connecting rod 90 is formed with a substantially elongated and straight central portion 100 terminating at one end with an arcuated portion 102 to which the pin 96 is integrally attached. The other end of the central portion 100 has an angular portion 104 and an offset portion 106 formed with the externally threaded ends 92. The rod offset portion in a first plane permits use of the offset on the second lever means 28 and yet prevents contact between the rod and the engine. The additional offset in a second endwise direction permits reciprocation of the brake pedal without engagement with the rod 90. The offset at 104 also makes it possible to use the shorter lever means 28.

When it is desired to convert a vehicle from the vacuumatic shift such as shown in Figure 1, to the arrangement for mechanical shifting of the gears, the vacuum cylinder 12, hose 13, bellows 14, protecting housing 16, rod 26', second lever means 28', and hose 18 are removed. The second lever means 28' is then fixedly secured to the gearshift shaft 64 and the connecting rod 26 is pivotally connected to the second lever means 28 by means of the swivel 82. The link 24 which is supported by pin 50 and pin 96 of connecting rod 90 at 98, as seen in Figure 5, is then added to the first lever means 22. The closure plug or cork 75, shown in Figure 6, is installed in the open end of the vacuum pipe where hose 18 originally was connected. Shifting of the gears of the transmission may then be effected in the normal manner.

The connection between the rock shaft 110 and the gearshift shaft 64 is best shown in Figures 2 through 4 and is conventional with Chevrolets of the models 1940 through 1948. A detailed description thereof may be had by reference to the Chevrolet Motor Company parts book as of April 1, 1950, page 166 showing the connection described in the accompanying description.

When the hand grip is moved toward the steering wheel, the gearshift shaft 64 is moved upwardly along with second lever means 28, thereby also lifting lever C. Upon pivoting of the gearshift shaft, it will be seen that rod 91 can be reciprocated for pivoting lever 111 and shaft 110.

In view of the foregoing, it is believed that a device has been provided which will accomplish all of the objects hereinabove set forth.

Having described the invention, what is claimed as new is:

1. A gear shift conversion apparatus for vehicles employing vacuumatic shifting means having a rock shaft, a second shaft and a first lever means connected to the second shaft, the apparatus comprising a second lever means connected to the shift shaft of the vehicle, an angulated rod having one end pivotally connected to said second lever means, and an arcuate link interconnecting the other end of said rod and said first lever means.

2. A gear shift conversion apparatus for vehicles employing vacuumatic shifting means having a rock shaft, a second shaft and a first lever means for connection to the second shaft, said apparatus comprising a second lever means connected to the shift shaft of the vehicle, an angulated rod having one end pivotally connected to said second lever means, and a link interconnecting the other end of said rod and said first lever means, said rod having a substantially straight and elongated central portion terminating at one end in an arcuated portion for connection to said link.

3. A gearshift conversion apparatus for vehicles employing vacuumatic shifting means having a rock shaft, a second shaft and a first lever means for connection to the second shaft, said apparatus comprising a second lever means connected to the shift shaft of the vehicle, an angulated rod having one end pivotally connected to said second lever means, and a link interconnecting the other end of said rod and said first lever means, said rod having a substantially straight and elongated central portion terminating at one end in an arcuated portion for connection to said link, and the other end of said rod having a first angular portion and a second offset portion parallel to said central portion.

4. A gearshift conversion apparatus for vehicles employing vacuumatic shifting means having a rock shaft, a second shaft and a first lever means for connection to the second shaft, said first lever means including a C-clamp portion for connection to the second shaft, and an extension to which a link is pivotally connected, said apparatus comprising a second lever means connected to the shift shaft of the vehicle, an angulated rod having one end pivotally connected to said second lever means, and a link interconnecting the other end of said rod and the extension on said first lever means.

5. A gearshift conversion apparatus for vehicles employing vacuumatic shifting means having a rock shaft, a second shaft and a first lever means for connection to the second shaft, said apparatus comprising a second lever means connected to the shift shaft of the vehicle, an angulated rod having one end pivotally connected to said second lever means, and a link interconnecting the other end of said rod and said first lever means, said second lever means including a flat strap having a bifurcated U-shaped portion for receiving the gearshift shaft.

6. A gearshift conversion apparatus for vehicles employing vacuumatic shifting means having a rock shaft, a second shaft and a first lever means for connection to the second shaft, said apparatus comprising a second lever means connected to the shift shaft of the vehicle, an angulated rod having one end pivotally connected to said second lever means, and a link interconnecting the other end of said rod and said first lever means, said second lever means including a flat strap having a bifurcated U-shaped portion for receiving the gearshift shaft, and means for clampingly securing said second lever means to the shift shaft.

7. A gearshift conversion apparatus for vehicles employing vacuumatic shifting means having a rock shaft, a second shaft and a first lever means for connection to the second shaft, said apparatus comprising a second lever means connected to the shift shaft of the vehicle, an angulated rod having one end pivotally connected to said second lever means, and a link interconnecting the other end of said rod and said first lever means, said second lever means including a flat strap having a bifurcated U-shaped portion for receiving the gearshift shaft, said flat strap having an offset portion for rotatably supporting said rod.

MERLE E. MARTIN.

References Cited in the file of this patent

UNITED STATES PATENTS

| Number | Name | Date |
|---|---|---|
| 2,195,269 | Coughtry | Mar. 26, 1940 |
| 2,275,779 | MacPherson | Mar. 10, 1942 |